Patented Aug. 26, 1930

1,773,837

UNITED STATES PATENT OFFICE

RICHARD WOLFFENSTEIN, OF BERLIN-DAHLEM, GERMANY

DERIVATIVES OF QUINOLINE AND PROCESS FOR MAKING SAME

No Drawing. Application filed January 10, 1929, Serial No. 331,718, and in Germany January 23, 1928.

It is known that α-phenylcinchoninic-acid is characterized physiologically by its uric acid solvent effect and by its analgetic properties. Furthermore it is known that this acid has the drawback of having so strong an acid property that it irritates the organism when taken.

Various proposals have already been made to modify this acid reaction by transforming the carboxyl group by means of various substituents, such as hydroxyalkyl groups or amino groups. These do not altogether achieve the object aimed at as they can readily be split off.

By the present invention the above mentioned detrimental effects of phenylcinchoninic-acid are overcome and its physiological effect is increased by transforming the carboxyl group of the phenylcinchoninic-acid by means of derivatives of the carbamic-acid. This effect is obtained by reacting phenylcinchoninic-acid-halide upon such derivatives of esters of carbamic-acid which still possess at least one hydrogen-atom attached to the nitrogen-atom.

By the present invention it also has been found that still better results are obtained by using derivatives of urethane, more especially urethane as such. On the other hand it has been shown that instead of the actual phenylcinchoninic-acid such phenylcinchoninic-acids advantageously may be used which are substituted in the neucleus-part of the molecule. Finally it has been established that the best way to obtain the wanted products is to start from phenylcinchoninic-acid-halide or its derivatives, more especially from phenylcinchoninic-acid-chloride.

The esters of the carbamic-acid and their derivatives are themselves already known as analgetic and soporific agents and the introduction of these groups into phenylcinchoninic-acid not only takes off the detrimental acid character of phenylcinchoninic-acid, but new, efficient and pain-allaying compounds are obtained by the introduction of these atom-groups and they are not readily split off.

Of special value proved the compounds of urethane.

By the following examples some methods of working are shown:—

(1) 2,5 kg. of phenylcinchoninic-acid are boiled with 7 kg. thionyl-chloride 15 hours under reflux. The reaction-product remaining after the distilling off of the thionyl-chloride is boiled with 1,1 kg. of the ethyl ester of carbamic-acid and 4 liters benzene for 4 hours. By the addition of water and a soda-solution in such an amount that the solution shows slightly basic reaction, the reaction-product is separated in form of a yellowish-brown powder. After the isolation it is recrystallized by means of alcohol, benzene or acetone.

Yield: 2,3–2,4 kg.

(2) 2,6 kg. of the chloride of phenylcinchoninic-acid in a very fine state of powder are intimately mixed with 1,1 kg. of the ethyl ester of the carbamic-acid and cautiously warmed by means of vapour. At a temperature of about 80° a vivid reaction takes place whilst hydrochloric acid gas is split off, whereby a tough fused mass is obtained. After warming for about 1 hour, the product is allowed to cool and afterwards the powdered fused mass is taken up with water and soda-solution. Thereby the reaction-product is separated in a powder state. After centrifuging it is washed with water, dried and recrystallized by means of alcohol, benzene or acetone.

Yield: 2,3–2,4 kg.

(3) By the action of methyl ester of carbamic-acid on phenylcinchoninic-acid-chloride, the corresponding methyl compound may be obtained in like manner. The reaction-product between the phenylcinchoninic-acid or its acid-derivatives and the ethyl ester of the carbamic-acid consists of yellowish-white short crystals or of unregular small leaves. It is nearly insoluble in water, but soluble in all important organic solvents (petroleum-ether excepted) when slightly warmed up; the same applies to diluted mineral-acids. The melting-point is about 172–173° C.

(4) To a suspension of 12,4 g. phenylcinchoninic-acid in 150 ccm. benzene, 2,0 g. sodium amide are added. After tempering of the ammonia evolution, to the reaction-mixture 10,0 g. diethyl ester of carbonic acid are added, and the mixture is boiled for some hours, whereby the greater part is dissolved. The undissolved part is afterwards treated with hydrochloric acid (25%), whereby it is dissolved to a large extent. After filtering, to the clear hydrochloric acid reaction showing solution soda is added, whereby the raw phenylcinchoninic-urethane is obtained in form of nearly white flocks. After the recrystallization by means of alcohol it shows a melting-point of 172-173° C.

The amide of the phenylcinchoninic-acid used according to the above as starting material may be produced in any suitable well-known manner, e. g. from the methyl ester of the phenylcinchoninic-acid (see H. Meyer, Monatshefte für Chemie 28, page 39 (1907)).

Claims:

1. A process for the production of condensation products of phenylcinchoninic-acid and carbamic-acid which comprises reacting phenylcinchoninic-acid-halide upon derivatives of carbamic-acid which still possess at least one hydrogen-atom attached to the nitrogen-atom, whilst heating.

2. A process for the production of condensation products of phenylcinchoninic-acid and carbamic-acid which comprises reacting phenylcinchoninic-acid-halide upon an ester of carbamic-acid, whilst heating.

3. A process for the production of condensation products of phenylcinchoninic-acid-urethane which comprises reacting phenylcinchoninic-acid-halide upon urethane, whilst heating.

4. A process for the production of condensation products of phenylcinchoninic-acid and carbamic-acid which comprises reacting phenylcinchoninic-acid-chloride upon derivatives of carbamic-acid which still possess at least one hydrogen-atom attached to the nitrogen-atom, whilst heating.

5. A process for the production of condensation products of phenylcinchoninic-acid and carbamic-acid which comprises reacting phenylcinchoninic-acid-chloride upon an ester of carbamic-acid, whilst heating.

6. A process for the production of condensation products of phenylcinchoninic-acid-urethane which comprises reacting phenylcinchoninic-acid-chloride upon urethane, whilst heating.

7. A process for the production of condensation products of phenylcinchoninic-acid-urethane which consists in mixing phenylcinchoninic-chloride with urethane, warming up the mixture, heating and afterwards cooling same, taking up the fused mass with water, and adding soda-solution, thereby precipitating the phenylcinchoninic-acid-urethane; centrifuging the raw product, washing and drying same and recrystallizing.

8. A process for the production of condensation products of phenylcinchoninic-acid-urethane which consists in mixing phenylcinchoninic-chloride with urethane, dissolving the mixture in a solvent, warming up the solution, heating and afterwards cooling same.

9. A process for the production of condensation products of phenylcinchoninic-acid-urethane which consists in mixing phenylcinchoninic-acid-chloride with urethane, dissolving the mixture in a solvent, warming up the solution, heating and afterwards cooling same, adding water- and soda-solution, thereby precipitating the phenylcinchonionic-acid-urethane; centrifuging the raw product, washing and drying same and recrystallizing.

10. As a new article of manufacture phenylcinchoninic-acid-urethane consisting of yellowish-white small crystals nearly insoluble in water, soluble in all important organic solvents whilst being warm with the exception of petroleum-ether, furthermore soluble in diluted mineral acids, characterized by a melting of 172-173° C. having probably the structure formula:

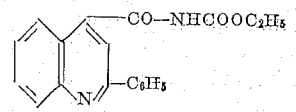

and capable of producing desirable physiological effects.

In testimony whereof I have hereunto signed my name.

RICHARD WOLFFENSTEIN.